United States Patent [19]
Moerke

[11] 3,775,584
[45] Nov. 27, 1973

[54] WELDING GUN
[76] Inventor: Delford A. Moerke, Lombard, Ill.
[22] Filed: Nov. 30, 1972
[21] Appl. No.: 310,940

[52] U.S. Cl............................... 219/130, 219/74
[51] Int. Cl.............................................. B23k 9/00
[58] Field of Search............................ 219/74, 130

[56] References Cited
UNITED STATES PATENTS
3,496,328  2/1970  Moerke.............................. 219/130
3,529,128  9/1970  Cruz, Jr............................. 219/130

Primary Examiner—C. L. Albritton
Attorney—John A. Dienner et al.

[57] ABSTRACT

Portable welding gun has an outer housing and a detachable inner body through which the wire electrode and inert gas feed. A water-cooled separable nozzle body is assembled to said housing and about a forwardly projecting portion of the inner body which supports a replaceable current pick up tip through which the wire electrode feeds to the outer end of the nozzle body. The forwardly projecting portion comprises inner and outer sleeves which define an inert gas chamber encircling the electrode and is so ported as to distribute the inert gas about the current pick up tip, the nozzle body channeling the encircling gas to its outer end to provide a protective shield thereof about the welding arc.

9 Claims, 9 Drawing Figures

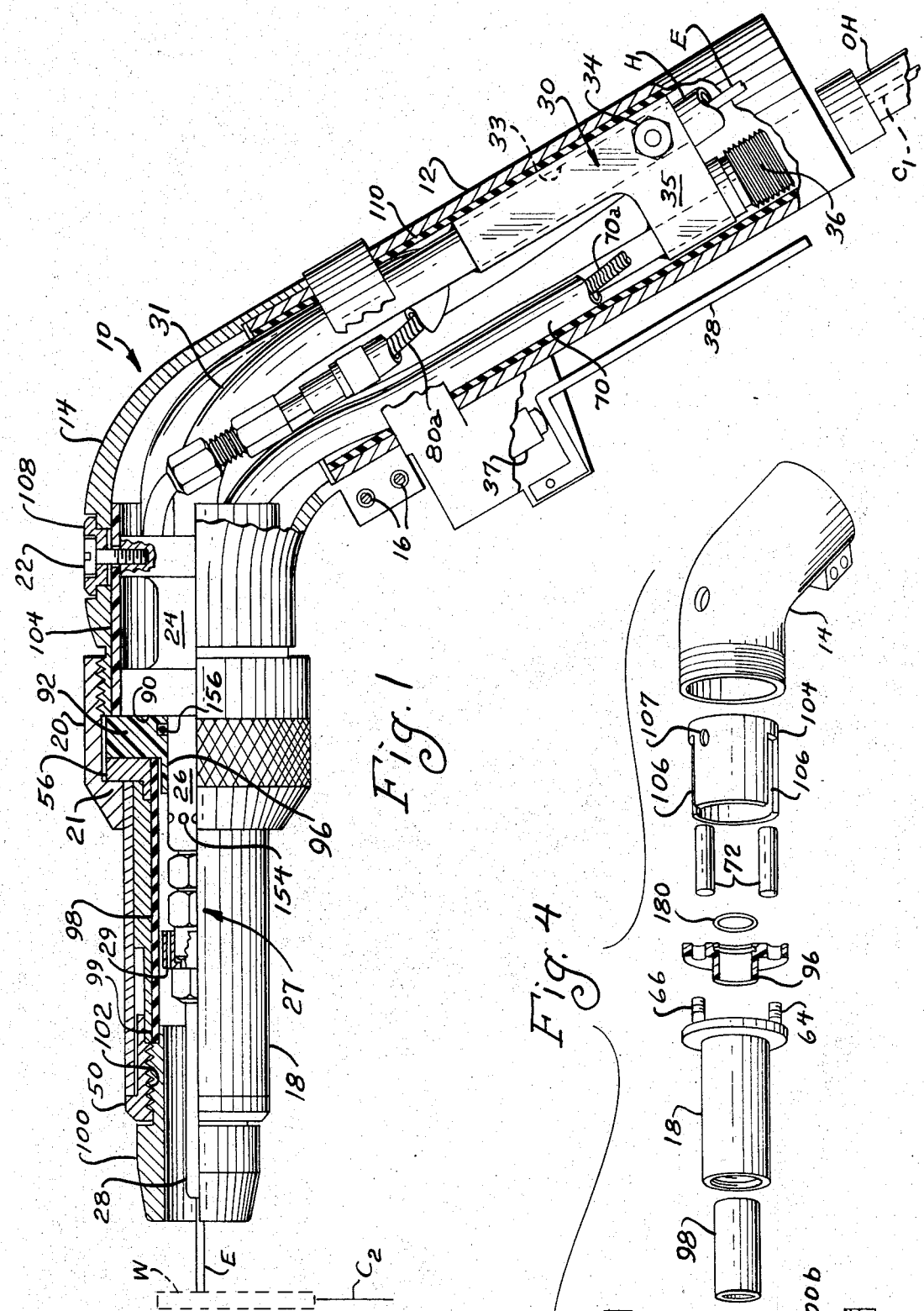

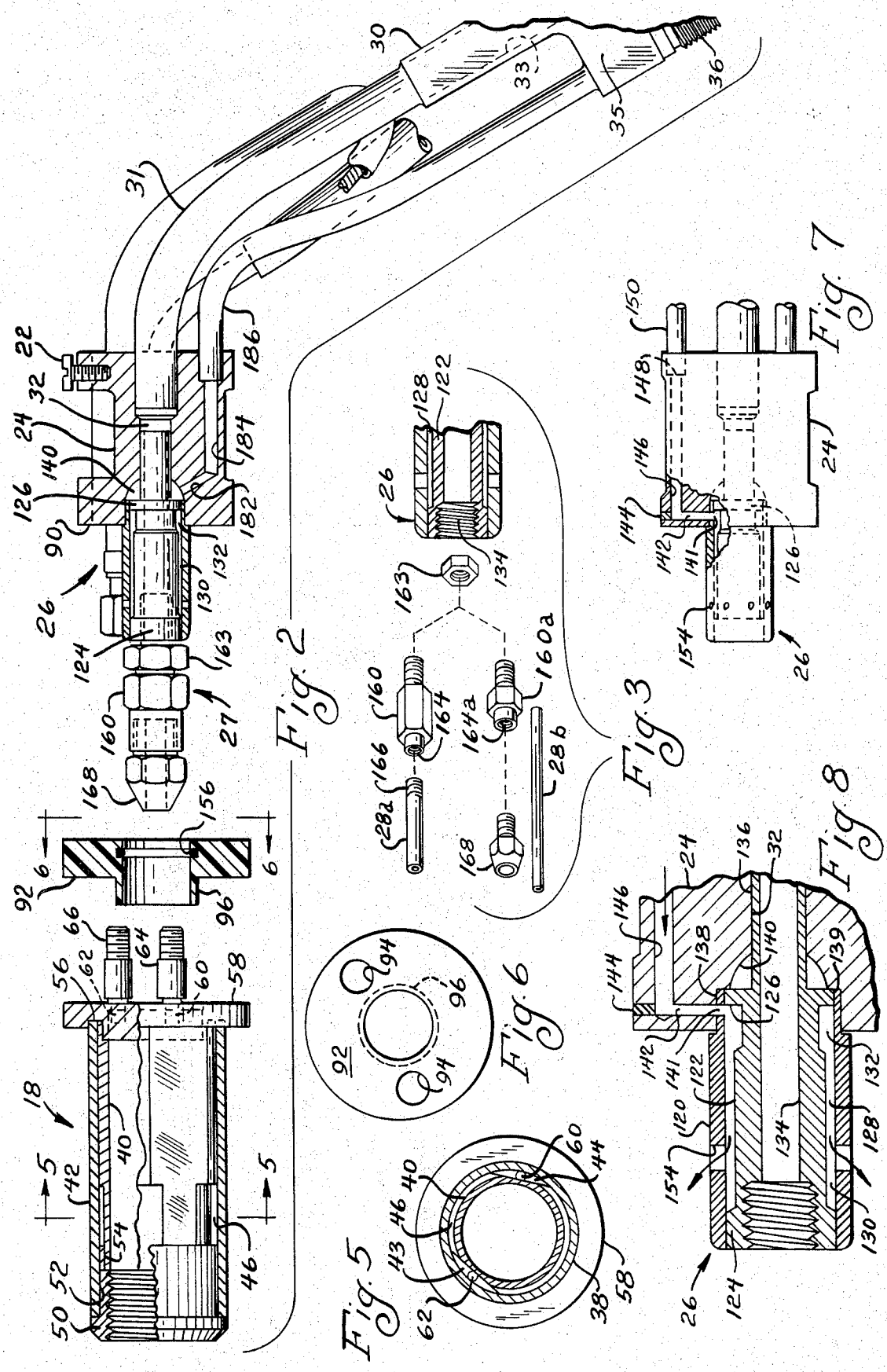

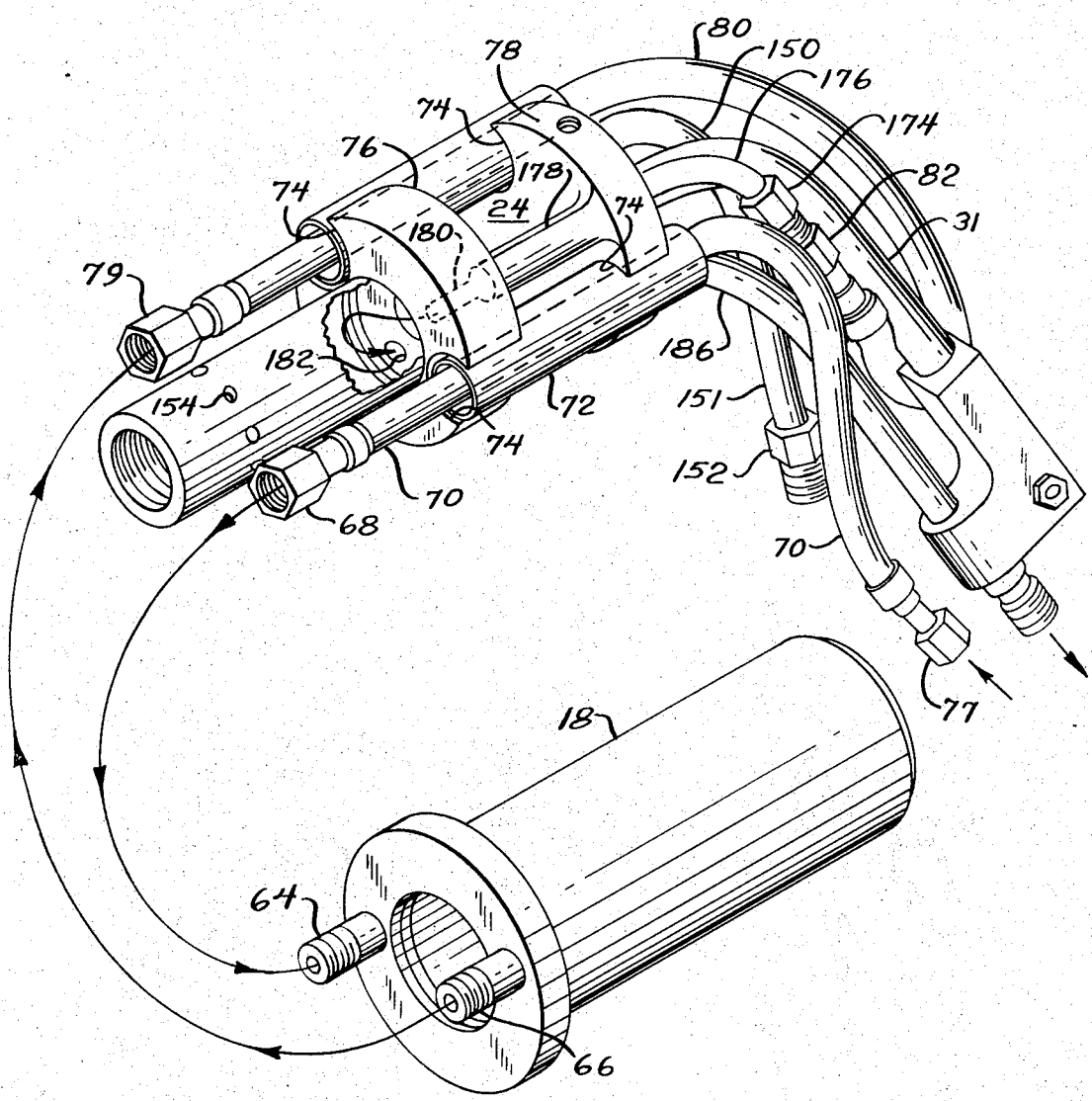

WELDING GUN

This invention relates to welding apparatus and particularly to a novel construction of so-called arc welding guns which are manually operated by moving their nozzle end along the seam of a workpiece to be united as the operator actuates a trigger to maintain an arc between the workpiece and a consumable wire electrode which feeds through the nozzle end of the guns.

In my U.S. Pat. No. 3,496,328 issued Feb. 17, 1970, I disclose one such gun in which the nozzle comprises separable inner and outer concentric shells which are cooled by water serially flowing through provided passageways in the walls of the two shells. The inner shell has an integral double-flanged spool mount on its rear end which is removably secured within one end of the gun housing, and to which the flanged end of the outer shell is removably assembled. The inner shell and its mount have a central longitudinal bore providing a path through which the electrode wire feeds to the outer end of the gun nozzle; and a clearance space between the two shells is fed inert gas from the inert gas hose connected to the mount and directs the flow of the inert gas outwardly of the nozzle providing a protective shield of said gas for the welding arc.

In said patented gun an insulating washer is placed between the flanged end of the outer nozzle body and the spool mount of the inner shell to electrically isolate the outer nozzle shell from the inner shell and mount which comprise a part of the welding arc circuit. To permit passage of the inert gas into the clearance space between the inner and outer shells, this washer is provided with an opening which when correctly assembled aligns with an opening in the mount to which the inert gas tube connects. The opening in the washer also aligns with a recess in the flanged end of the outer nozzle shell which communicates with the clearance space between the two shells and so permits flow thereto of the inert gas.

It is a feature of this invention that the inner body of a welding gun such as described in my aforementioned patent has been modified to include a forwardly projecting gas chamber which is directly connected through the mount with an inert gas hose connector. The portion comprising the forwardly projecting gas chamber terminates short of the nozzle end of the gun and is therefore shielded by the outer nozzle body from possible metal spatter and injury thereto in handling of the gun. In accordance with this invention, however, said forwardly projecting body includes mounting means to which a replaceable current pick up tip may be easily attached to carry the wire electrode out to the end of the gun nozzle. The end of the outer nozzle body is also adapted to removably secure a replaceable tip. Thus, an important feature of the invention is that the tips of both the outer nozzle body and the inner body which supplies both the wire electrode and one side of the welding current to the workpiece are expendable and may be readily replaced, simplifying repairs and maintenance, as well as reducing the costs thereof.

A companion feature of the invention is that said arrangement also makes it possible to readily change the configuration, as well as length, of the nozzle by selecting a size and shape of nozzle tip and current pick up tip which will satisfy a particular welding requirement. In accordance with the invention, it is contemplated that an operator of a welding gun according to the present invention will be supplied with a plurality of such gas nozzle tips and current pick up tips so that the versatility of his welding gun is considerably increased over the usual welding gun available to him.

Another feature of the invention is the novel construction of the inner body of a welding gun which promotes connection of the inert gas hose and wire electrode casing thereto at the rear end of the handgrip portion and the direction of the wire electrode through the gun to the outer end of its nozzle while simultaneously providing a surrounding shield of inert gas through the length of the gun nozzle.

Thus, in a preferred construction of welding gun constructed in accordance with the invention, the inner body of the gun includes a rear mounting member having rigid integral connectors which extend rearwardly therefrom into the hand grip of the housing for convenient connection of the gas hose and wire electrode casing thereto. These connectors are secured within axial bores through the inner body which in one instance provide passage for the wire electrode to the replaceable current pick up tip when attached thereto and in another instance to a gas distribution chamber which surrounds the forward end of said wire electrode feeding bore and protrudes into the hollow of the nozzle body, the forwardly projecting part of the inner body which comprises said gas distribution chamber having perforations about its forward end for uniform discharge of the inert gas about the clearance pick up tip mounting means.

A further feature of the invention is the novel construction of the inner nozzle body which receives cooling fluid discharging from the outer nozzle body and channels it about the inner end of the portion comprising the inert gas distribution chamber which seats in the electrode feed bore of the mounting member to conductively cool the inner body.

Companion to the above features of the invention is a welding gun construction which is simple and convenient to manufacture and assemble and is effective in its operation as well as easily maintained.

Still another feature is the provision of a welding gun construction in which the parts through which the wire electrode is fed and is therefore closest to the arc welding arc is effectively chilled and otherwise arranged to minimize damage therethrough from metal spattering during the welding operation or in handling of the gun, and at the same time comprising expendable parts which are inexpensive and readily replaceable.

Many other objects and advantages, as well as features of the invention, will be apparent or will become so after consideration of the description of a preferred embodiment of the invention which now will be described.

Therefore, referring first to the several views constituting the drawings wherein like parts are identified by like reference numerals:

FIG. 1 illustrates in side elevation an electric arc welding gun embodying the present invention, portions thereof being cut away to illustrate details in construction of the same;

FIG. 2 is a longitudinal sectional view taken through the welding gun illustrated by FIG. 1, the outer nozzle body and insulating washer which are assembled with the flanged inner body being shown in exploded relation;

FIG. 3 is an exploded view and illustrates alternate constructions for mounting a current pick up tip to the inner body of the welding gun;

FIG. 4 is an exploded view of the outer nozzle body, and associated insulating elements which electrically isolate it from the welding circuit, said view also illustrating alternate gas nozzles which may be attached to the outer end of the nozzle body;

FIG. 5 is a sectional view taken through the nozzle body along lines 5—5 of FIG. 2 looking in the direction indicated by the arrows;

FIG. 6 is a sectional view taken along lines 6—6 of FIG. 2 looking in the direction indicated by the arrows and shows in plan view details of the insulating washer which is clamped between the flanged end of the nozzle body and the inner body of the illustrated welding gun;

FIG. 7 is a view taken of the inner body of the welding gun shown turned 90° with respect to the position thereof illustrated in FIG. 2;

FIG. 8 is a fragmented view of the forwardly projecting portion of the mounting member illustrated by FIG. 7 but on a larger scale to illustrate details in the construction of the gas distribution chamber and how it is ported to receive and discharge the inert gas; and FIG. 9 is a perspective view taken of the inner body and outer nozzle body, the same shown in separated relationship and the current pick up tip and its mounting structure being omitted, the view illustrating the serial path of water flow through the outer nozzle and inner body.

Referring now more specifically to the several views of the drawing wherein a manually supported arc welding gun in accordance with this invention is indicated generally at 10, such a gun is illustrated at FIG. 1 as comprising an open ended two-part longitudinally curved outer housing consisting of a rear generally cylindrical shaped tubular hand grip portion 12 and a forwardly located elbow portion 14 removably secured to one end thereof in any suitable manner as by bolts 16. Removably connected to the forward end of said elbow portion 14 of the housing is a forwardly projecting outer nozzle body 18, its assembly being achieved through a cone nut 20 which is threadedly connected to the externally threaded forward wall of the elbow housing portion 14. Within said elbow portion 14 is an inner body comprising a mounting member 24 having an integrally related forward portion 26 which projects into the hollow interior of the nozzle body 18. A set screw 22 detachably secures mounting member 24 within the housing portion 14. Detachably mounted to the forward end of projecting portion 24 by mounting means indicated generally at 27 is a replaceable current pick up tip 28 through which a consumable wire electrode E is directed outwardly to and through the nozzle end in its normal operation. Surrounding said mounting means is a spatter disc 29.

As illustrated by FIG. 1, housing portion 12 is inclined to nozzle 18 at a comfortable angle for manual manipulation of the gun in a welding operation. Said cylindrical housing portion 12 also encloses connection of the various utility hoses to the inner body, access to the connectors therefor being obtained through the rear open end of said housing portion 12. As illustrated by FIG. 1, a fixture 30 is located just inside the rear open end of said housing portion 12 to which a cable housing H containing a consumable wire electrode E is attachable. As illustrated by said FIG. 1, fixture 30 includes an appropriately curved copper tube section 31 having one end extending within the enlarged end of a central bore 32 through the mounting member 24, being fixed thereto by silver brazing. The opposed end of tubular section 31 extends within a through bore 33 of fixture 30 to which it is similarly brazed and provides rigid support for fixture 30 centered within the open end of said housing portion 12. Through bore 33 in fixture 30 adapts said fixture as a connector which receives the end of cable housing H, the diameter of bore 33 being such that said cable housing may be pushed into said bore until it engages the secured end of tube section 31, set screw 34 being tightened thereupon to secure the cable housing H in place. As illustrated by said FIG. 1, fixture 30 also includes an angular extension 35 supporting a hose connector 36 to which a water outlet hose OH may be threadedly connected. As is conventional, water outlet hose OH contains a conductor $C_1$ which is electrically connected to one side of a source of welding current. Conductor $C_1$ is connected to the water outlet hose connector such that when the same is fastened to connector 36, extension 35 and thereby fixture 30 is electrically connected to said conductor $C_1$ such that the current pick up tip 28 and electrode E fed therethrough is connected to one side of the welding current supply as afterwards described. Conveniently located on hand grip 12 is a switch 37 which the operator closes by actuating trigger 38 which he operates by closing his hand thereabout and grasping housing portion 12. Closing switch 37 serves to pass an arc across the junction of wire electrode E with the workpiece W to form a weld in known manner. For this purpose, as is conventional, workpiece W is connected by a suitable conductor $C_2$ to the other side of a welding generator or other suitable source of welding current to which the conductor $C_1$ in the water outlet hose OH is also connected. As illustrated by FIG. 1, the circuit is completed from the electrode E through current pick up tip 28 and means 27 by which it is detachably secured through projecting portion 26 of the inner body, said portion 26, mounting member 24 and tube section 31 to fixture 30 and its connector 36. As is well known, a source for welding current may be a generator including a rectifier which provides the current characteristics required for the arc, the negative terminal of the generator being connected to the workpiece and the positive terminal to the wire electrode. This provides what is characterized in the industry as a reverse polarity welding arc when the circuit is closed. The invention, however, is also useful wherein the workpiece and the wire electrode are oppositely connected, that is with the workpiece connected to the positive side of the direct current source. It may also be employed in other arc welding methods.

Preferably, actuation of the switch 37 serves to energize control circuitry in the form of interconnected relays not shown. One of these relays closes a switch in the described arc welding circuit to produce an arc across the juncture of the wire electrode E with the workpiece. A second relay simultaneously energized operates a motor to drive feed rolls not shown by which the wire electrode E is fed through cable housing H into bore 33 of fixture 30 and eventually through the current pick up tip 28 to the workpiece where it is consumed in the welding operation. Another relay simultaneously energized operates a solenoid which opens a valve to allow an inert shielding gas from a supply not shown to be fed into means yet to be described which delivers the inert gas to the inner body portion 26 for distribution into the interior of the outer nozzle body 18 and about the current pick up tip 28, providing a shield of inert gas along the length thereof which discharges from the end of the nozzle to shield the arc which occurs in the welding act. The circuitry and apparatus thus actuated through trigger 38 to effect the arc and simultaneous movement of the wire electrode and gas flow provides no part of the present invention and therefore are not illustrated and will not be more particularly described. However, it is to be understood that suitable control circuitry and apparatus therefor is described in U.S. Pat No. 2,504,868 and to which reference may be had for a more complete description and understanding thereof.

Considering now FIG. 2 with FIG. 1, nozzle body 18 is preferably constructed and also adapted for removable assembly with mounting member 24 of the inner body as described in my aforementioned U.S. Pat. No. 3,496,328. Thus, as illustrated by FIG. 2, nozzle body 18 comprises an inner sleeve 40 and an outer sleeve 42. As illustrated by FIG. 5, inner sleeve 40 snugly fits within the bore of outer sleeve 42, except along longitudinal portions 43 and 44 which have been milled lengthwise of the inner sleeve 40. Therefore when assembled together the wall of the nozzle 18 comprises a pair of spaced longitudinally extending internal passages 43 and 44 which extend out to adjacent the end thereof. The forward end of inner sleeve 40 also has been reduced in diameter so as to provide an annular chamber 46 with which the forward ends of said passages 43 and 44 communicate. At 50 is an annular plug having an external recess 52 which fits within the forward end of outer sleeve 42 and an annular lip 54 which partially overlies the reduced end of the inner sleeve 40 and closes chamber 46. The end surfaces of the two sleeves which thus lap the plug 50 are silver brazed thereto to complete a water-tight heat-resistant permanent assembly. The rear ends of the two thus assembled sleeves 40, 42 are received within an annular recess 56 in a mounting disc 58 having a planar rear surface. These received ends also are silver brazed to the surface of said recess to complete the outer nozzle assembly. At 60 and 62 are a pair of ports in disc 58 which extend therethrough and communicate with passages 43, 44 respectively. Positioned in said ports and integrally joined to the walls thereof by silver brazing are a pair of externally threaded connectors 64 and 66, respectively. Considering FIG. 9 with FIGS. 1 and 2, it will be seen that connector 64 is detachably coupled to an internally threaded connector 68 on the end of a flexible tube 70 which slides within a nylon bushing 72 mounted within provided recesses 74 about flanges 76, 78 of the mounting member 24. Tube 70 is preferably formed of a flexible rubber having high heat resistance and is reinforced by a stainless spring liner 70a (FIG. 1). Its opposite end is provided with a connector 77 by which it is connected to a water inlet hose not shown. Connector 66 of the nozzle body 18 detachably couples to an internally threaded connector 79 of a second flexible rubber tube 80 also lined with a reinforcing stainless spring 80a (FIG. 1) and its opposite end is provided with a connector 82. Said connector 82 is detachably connected to an internally threaded connector 84 of a rigid tube 86 silver brazed to mounting member 24 of the inner body and establishes communication with a provided water chamber 140 (FIG. 2) in the mounting member 24 as afterwards more particularly described.

As illustrated in FIG. 1, cone nut 20 includes a flanged part 21 which engages behind the flanged portion of the outer nozzle 18 constituted by disc 58 such that when tightened on the externally threaded wall of elbow portion 14 of the gun housing the cone nut draws the same snugly against the forward side 90 of the inner body and about projecting portion 26 thereof so as to detachably secure the nozzle body 18. An insulating washer 92, located between disc 58 and said surface 90 so as to be clamped therebetween isolates the nozzle body 18 from the inner body including its mounting portion 24 and forwardly projecting portion 26 which constitute a conductive path for the arc welding circuit and are therefore "live" in the operation of the gun. To accommodate connectors 64, 66, insulating washer 92 is provided with appropriately spaced openings 94 through which said connectors 64, 66 pass. Insulating washer 92 preferably also has a flange portion 96 which, as seen in FIG. 1, extends partially into the hollow of the outer nozzle 18 and encircles projecting portion 26 of the inner gun body. Advantageously, said flange portion 96 has an O.D. less than the I.D. of the hollow interior of the outer nozzle body 18 so that it provides a space which receives one end of a first insulating sleeve 98 which lines the interior wall of the gun nozzle and therefore insulates it from the "live" projecting portion 26 of the inner body, current pick up tip 28 and mounting means 27 by which said tip is secured to portion 26. As illustrated by FIG. 1, the forward end of said insulating sleeve 98 is received within space 99 provided by the machined or reduced end of nozzle tip 100 which threadedly connects with internally threaded end 102 of the plug 50 in the end of nozzle 18. Insulating sleeve 98 thus shields the threaded connection of nozzle tip 100 to plug 50 from spatter during use of the gun.

Portions 12 and 14 comprising the outer housing of the welding gun may be constructed of a high heat and electrical insulating material such as phenolic resin impregnated with paper and/or asbestos fibers. Preferably, however, to provide the gun with sufficient overall strength and rigidity to resist the rough treatment to which said guns are customarily subjected, these housing portions are preferably formed of metal. To insulate the metal housing from the inner body, a second insulation sleeve 104 is disposed about member 24, this sleeve being provided with a pair of longitudinal slots 106 which as illustrated in FIG. 4 accommodate the nylon bushings 72 in which flexible tube 70 and 80 slide. Preferably, said sleeve 104 includes an opening 107 through which the aforementioned set screw 22 extends so as to threadedly connect into mounting member 24. Preferably, a nylon collar 108 is provided about the head of said set screw 22 and the head of the set screw is disposed substantially flush with or slightly below the outer surface of the housing elbow 14. A third insulation sleeve 110 may be inserted within the cylindrical part 12 of the housing to electrically isolate fixture 30 therefrom.

A feature of the present invention is the novel construction of the inner body which promotes uniform distribution of an inert gas about the current pick up tip 28 for channeling by the outer nozzle body 18 lengthwise of said tip 28 and outwardly of its foward end to provide a protective shield about the electric arc during operation of the welding gun and to inhibit so-called gas nozzle arcing. Thus, as illustrated by FIGS. 2, 7 and 8, the outer wall of projecting portion 26 comprises a pair of concentric sleeves 120, 122 which are shaped and assembled to provide a gas distribution chamber projecting into the interior of the gun nozzle as will now be described.

As illustrated by said FIGS. 2, 7 and 8, inner sleeve 122 comprises a flange 124 at its forward end and a second flange 126 spaced therefrom to the periphery of which flanges the outer sleeve 120 is silver brazed to assure gas tight and liquid tight connections. Intermediate said flanges 124 and 126 the outer surface of the inner sleeve 122 is stepped so that the closed chamber 128 defined by flanges 124,126 between the inner and outer sleeves comprises a shallow encircling chamber section 130 which extends the major length of the chamber and a narrow deeper chamber section 132 adjacent flange 126. As illustrated by FIG. 8, bore 134 of inner sleeve 122 is internally threaded at its forward end. Inner sleeve 122 also has a reduced end 136, the O.D. of which corresponds to the I.D. of the central bore 32 of the mounting member 24 which receives said reduced end 136 of sleeve 122.

Also, as illustrated by FIG. 8, the forward end of said central bore 32 includes an enlarged entrant end 138 of cylindrical shape having an I.D. corresponding to the O.D. of the inner end 139 of the projecting portion 24 which fits therein, the two portions being silver brazed into an integral unit. As illustrated by FIG. 7, the enlarged entrant end of bore 30 also includes a semi-spherical cavity 140 encircling projecting portion 136 which is closed by flange 126. As afterwards described, this cavity 140 is serially connected to the cooling passages of the outer nozzle body 18 so that the mounting member 24 and projecting portion 24 of the inner body are cooled by said chilling water before it is discharged from the welding gun. In order to render cavity 140 water-tight, projecting portion 136 of the inner sleeve is also silver brazed to the inner walls of bore 32.

As illustrated best in FIG. 8, outer sleeve 122 is provided with a port 141 which aligns with a radially drilled bore 142 in the mounting member 24, the outer end of said bore 122 being plugged as at 144. At 146 is a second bore drilled axially of the mounting member in offset spaced relation to its center bore 32, its end 148 being enlarged as illustrated by FIG. 7 to receive a fixture 150 which is secured therein as by silver brazing. Fixture 150, as seen best in FIG. 9, comprises a curved tubular section 151 which extends rearwardly to adjacent the outer end of the hand grip portion 12 of the gun housing and terminates in a connector 152 to which connects the lead hose from a supply of inert gas (not shown). At the forward end of the projecting portion 26, its outer sleeve 120 is provided with a plurality of circumferentially spaced openings or perforations 154 which communicate with chamber 128 so that gas filling said chamber 128 discharges into the hollow of the gun nozzle 18. It will be appreciated that port 141 being aligned with the narrower but deeper channel section 132, gas entering chamber 128 tends to first fill said deeper section 132 then spreading into the more shallow chamber section 130, promoting a uniform distribution of the gas discharging through perforations 154. The interior of the gun nozzle is therefore uniformly filled with the inert gas and completely envelopes the current pick up tip 28 as it is channeled outwardly along the length thereof to the tip 100 of the nozzle 18.

As illustrated by FIG. 1, the gas distribution member 26 comprises a small fraction of the axial length of the nozzle body 18 and, in fact, preferably comprises a length sufficient only to locate its gas discharge openings 154 forwardly of flange 96 of the insulating washer 92. Preferably, washer 92 includes a silicon gasket at 156 which engages about the outer wall of the gas distribution chamber to avoid reverse gas flow and assure that the gas exiting from perforations 154 is channeled by the nozzle 18 outwardly to and through its nozzle tip 100.

Being relatively short, the gas distribution chamber of member 26 is considerably spaced from where the welding arc occurs and is therefore protected by the more rugged forwardly projecting nozzle body 18 from metal spattering and possible injury as by rough handling of the gun. As previously indicated, the gas distribution member 26 also constitutes a support to which an expendable tip 28 may be attached as by mounting means 27 to provide means through which the consumable wire electrode may be supported out to the outer end of the nozzle body.

Referring therefore now to FIG. 3 which is to be considered with FIGS. 1 and 2, the aforementioned current pick up tip mounting means 27 comprises an adapter nut 160 or 160a which threadedly connects into the earlier mentioned internally threaded end 134 of the bore in the gas distribution member 26. Preferably a jam nut 163 is first threaded about the adapter nut 160 so as to lie between and securely mount the adapter nut to the gas distribution member. The current pick up tip 28 may be of the type illustrated at 28a in FIG. 3 having an externally threaded end 166 or it may comprise an unthreaded element as illustrated at 28b in said FIG. 3. Where the current pick up tip has a threaded end 166, adapter nut 160 is employed and the threaded end 166 of the tip 28a is threadedly connected with the internally threaded end 164 of through bore 162 of said adapter nut 160. If it is preferred to use a current pick up tip such as illustrated by 28b which is unthreaded, then an adapter 160a is assembled with the gas distribution member 26. Current pick up tip 28b is then inserted into the bore 162 of the adapter nut 160a and a collet nut 168 slipped thereover and threaded into the internally threaded end 164a of the collet nut adapter 160a. As is conventional, as the slotted thread end of the collet nut 168 is tightened on threads 164a of the through bore 162 of adapter 160a the collet nut is caused to tightly engage about the current pick up tip 28b to secure the tip in place. If desired, a wire electrode liner 170 having a through bore corresponding in diameter to the wire electrode may be first inserted into the bore 32 of the inner body to receive the electrode fed thereto from fixture 30, the pick up tip 28b being inserted through the adapter 160a into the bore of the inner body far enough to engage the electrode liner.

As previously mentioned, a feature of the invention is that means are also provided for cooling the gas distribution member 26 and the mounting member 24 of the inner body with which it is assembled. Considering FIG. 9 with FIG. 2, it will be seen that in accordance with the invention, flexible tube 80 which receives the water exiting from passageways in the outer nozzle body connects to a connector 174 on the outer end of a curved tube 176 which is secured within a bore 178 as by silver brazing, bore 178 communicating with an inclined second bore 180 which enters such chamber 140 as illustrated by FIG. 9. As illustrated in said FIG. 9, cavity 140 is provided with an exit port 182 which as illustrated in FIG. 2 leads to bore 184 which extends axially through member 24 and terminates in an enlarged end in which is secured a connector 186 as by silver brazing. Connector 186 communicates with the water discharge hose connector 36 previously mentioned as comprising an integral part of the electrode cable housing fixture 30.

Thus, it will be apparent that a welding gun construction has been illustrated and described capable of achieving all the recited objects and features of the invention. Thus, it will be apparent that while grasping hand grip portion 12 of the outer housing of the gun an operator may utilize the gun in a welding operation by actuating trigger 38 to feed wire electrode E from casing H through fixture 30, its tube 31 into bore 32 of mounting member 24 through the central bore of the gas distribution member 26 the mounting means 27 including adapter nut 160 and the current pick up tube 28 attached thereby to member 26. Simultaneously, gas will be effectively caused to flow through the mounting member 24 via ports 146 and 142 into chamber 128 of the gas distribution member, discharging therefrom through perforations or openings 154 into the hollow interior of the common nozzle 18. By reason of the described construction of the gas distribution member 26 the discharging gas will completely fill the interior of the nozzle, being channeled thereby along the length of the current pick up trip 28 outwardly of the gas nozzle 100 to provide a protective shield of the inert gas about the welding arc. Simultaneously, chilling water entering flexible tube 70 will enter one of passageways 43,44 proceeding through chamber 46 at the forward end and returning via the other passageway exiting into flexible tube section 80 from whence it flows through the mounting member 24 via ports 178 and 180 into chamber 140 to also cool the inner body including its gas distribution member 26 and being discharged through port 182 into a second axially directed bore 184 leading to the water outlet hose connector 36.

Thus, in accordance with the invention, the outer nozzle body 18 which is held close to the welding arc in operation of the gun is cooled by the flow of the water therethrough and simultaneously is protected from the arc by a protective shield of inert gas distributed into the hollow interior of the nozzle by the gas distribution member 26 and projecting from the end of the nozzle about the arc. The gas distribution member being relatively short is protected by the more rugged and forwardly projecting nozzle body 18. It is also chilled by the water discharging from the passageways of the nozzle body 18. As illustrated in FIG. 4, the gas nozzle tip 100 when damaged is readily replaceable. Also to satisfy requirements of a specific welding, any one of several gas nozzle tips of different lengths and/or shapes as illustrated at 100a and 100b in FIG. 4 may be substituted. Similarly, the inner body of the welding gun is provided with a readily replaceable expendable current pick up tip 28 of any required length and bore thickness to accommodate the gauge of wire electrode being utilized and the length of the selected gas nozzle 18 and its tip 100.

It will be further appreciated that in the event the outer nozzle body 18 is itself damaged or a nozzle body of a longer or shorter overall length is required, said nozzle body 18 can be easily removed by loosening cone nut 20 and pulling the flexible tube 70 and 80 through the insulation washer 92 and out of their respective nylon bushing 72 far enough to permit loosening of their connectors 68 and 78 from connectors 64 and 66 of the nozzle 18. A new nozzle body may be then reattached by connecting its connectors 64, 66 to connectors 68,78 of said tubing 70,80 respectively, pushing the parts together, reassembling the cone nut 20 and threadedly tightening it on the elbow portion 14 of the outer housing.

Thus, it will be apparent that all of the recited objects, advantages, as well as features of the invention have been described as obtainable in a construction of arc welding gun which is simple and practical to manufacture as well as sufficient and effective in its operation.

Having described my invention, I claim:

1. In a welding gun, the combination of an open-ended housing comprising a hand grip portion, an inner body removably secured within said housing, said inner body including a rear mounting member having a central bore therethrough and a forwardly disposed gas distributing member fixed to said mounting member with one end thereof seated in said bore, a first connector projecting rearwardly of said mounting member to which the wire electrode casing connects for feeding an electrode into the inner body bore, a replaceable tubular current pick up tip, means releaseably securing said current pick up tip to the forward end of the gas distributing member, and an outer nozzle body removably assembled with said mounting member in spaced encircling relation about said gas distributing member and projecting forwardly thereof to surround said current pick up tip, said gas distribution member embodying concentric inner and outer sleeves, the inner sleeve having an electrode feeding bore aligned with the central bore of the mounting member to receive a wire electrode therefrom and direct it into the bore of the tubular current pick up tip, the outer sleeve defining with the inner sleeve a closed chamber encircling said inner sleeve, the mounting member containing port means which communicate at one end with said chamber through an opening in a portion of the outer sleeve seated in the bore of said member, the opposite end of said port means communicating with a second connector secured to the rear end of the mounting member to which an inert gas hose connects, the outer sleeve of said gas distributing member further having perforations circumferentially spaced about its forward end through which inert gas from said chamber discharges about the current pick up tip mounting means, the discharging gas being channeled by the outer nozzle body to its outer end where the gas provides a protective shield about the welding arc produced in use of the welding gun.

2. The combination of claim 1 wherein the port means of the mounting member comprises a radial bore communicating at one end with said opening in the outer sleeve of the gas distributing member, the other end of said radial bore being closed, and an axial bore offset from its central bore, said axial bore communicating with the radial bore and containing the second connector to which the inert gas hose connects.

3. The combination of claim 1 wherein the mounting member further includes a recessed area about the end of the gas distribution member seated in the central bore of the mounting member, said recessed area being closed by said end of the gas distribution member, and the mounting member having further bore means which communicate with said recessed area and have means which connect to water supply and discharge hoses to permit flow of cooling water about the end of the gas distribution member seated in the mounting member.

4. The combination of claim 3 wherein the rearwardly extending wire electrode casing connector also supports the mentioned water discharge hose connector.

5. The combination of claim 1 wherein the wall of the outer nozzle body includes a pair of internally located spaced passageways which extend longitudinally thereof and communicate with each other adjacent the forward end thereof, said mounting member slidably supporting first flexible tube means which connect one of said passageways to a cooling water supply hose and second flexible tube means which connect the other one of said passageways for discharge of said water whereby cooling water may be continuously flowed through the outer nozzle body and about the forward end thereof.

6. The combination of claim 1 wherein the forward end of the outer nozzle body is adapted for threadedly connecting a replaceable nozzle about the current pick up tip and means are provided within the outer nozzle body for shielding the threaded connection from spattering.

7. The combination of claim 5 wherein the mounting member also includes a recessed area therein surrounding the end of the gas distribution member seated in the central bore thereof and closed thereby, a pair of additional port means extending axially of the mounting member each communicating at one end with said recessed area, a tube mounting connector fixed with the other end of one of said additional port means at the rear end of the mounting member, said second slidable tube means comprising a flexible tube folded on itself, one end of said flexible tube being connected with one of said passageways of the outer nozzle body and its other end being connected to said tube mounting connector, the other of said additional port means connecting to a water discharge hose connector.

8. The combination of claim 7 wherein the mounting member has a pair of axially extending recesses in its outer periphery, the folded flexible tube being slidably supported in one of said recesses and the first flexible tube means which connects one of said passageways of the outer nozzle body to a water supply hose connector being slidably supported in the other of said recesses.

9. The combination oF claim 8 wherein means are provided for ready attachment and disconnection of the passageways of the outer nozzle body with said first and second flexible tube means.

* * * * *